July 31, 1956  G. N. THRESHER ET AL  2,756,613
CONNECTING ROD
Filed March 16, 1955  2 Sheets-Sheet 1

INVENTORS.
Griffith N. Thresher
BY Michael G. Simon

Griswold & Burdick
ATTORNEYS

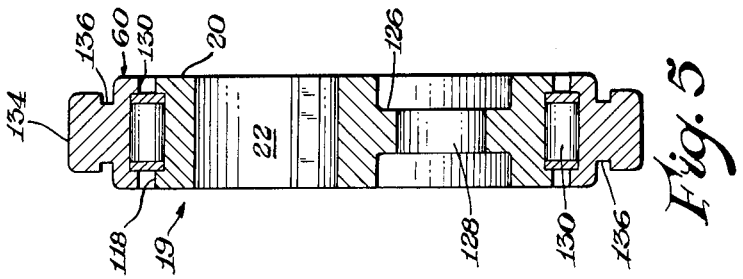
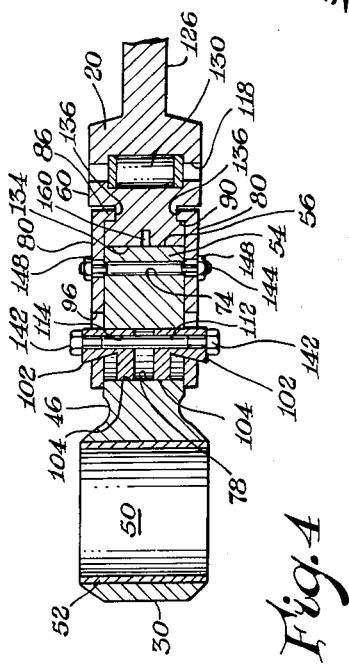
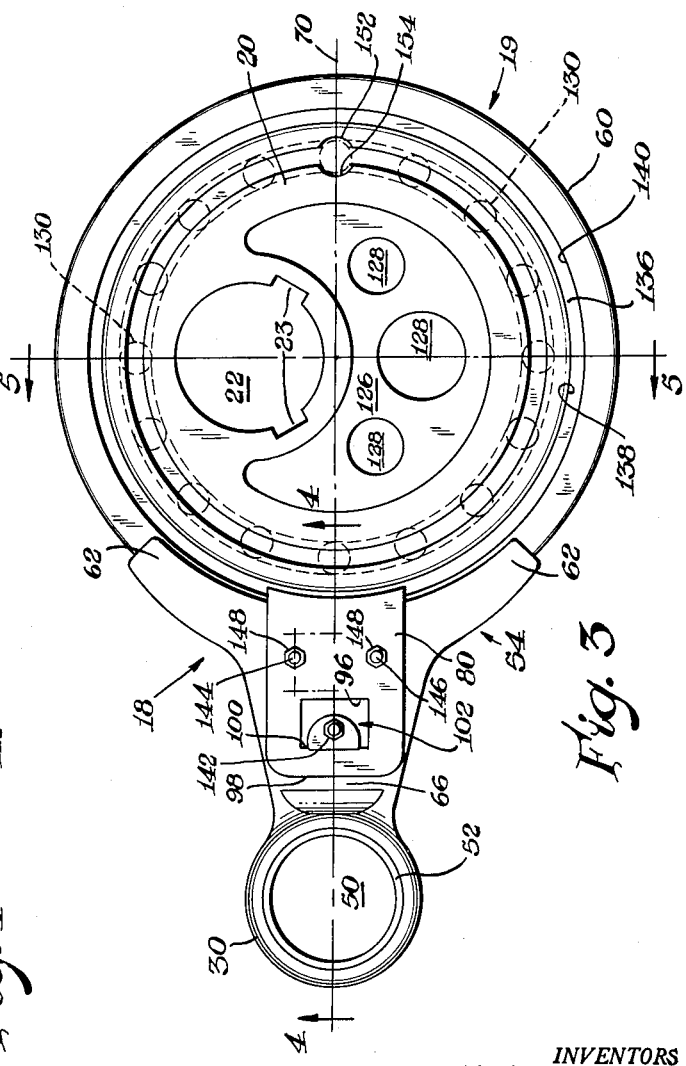
INVENTORS
Griffith N. Thresher
Michael G. Simon
BY
Griswold & Burdick
ATTORNEYS

United States Patent Office

2,756,613
Patented July 31, 1956

2,756,613

CONNECTING ROD

Griffith N. Thresher and Michael G. Simon, Tulsa, Okla., assignors to The Dow Chemical Company, Midland, Mich., a corporation of Delaware Application March 16, 1955, Serial No. 494,606

10 Claims. (Cl. 74—579)

This invention relates to connecting rods and particularly to connecting rods in which a bearing end of the rod is detachable from the shank of the rod.

Connecting rods having roller bearings in the ends thereof have been commercially available for a considerable time. The roller bearings in such rods usually have their outer race press-fitted into a bored rod end which is integral with the rod shank or are fitted into a split rod-end and are then held in place by tightening bolts which hold together the split end of the rod.

While such roller bearing type connecting rods give excellent service in many applications, they are subject to some shortcomings which often become serious when they are used in certain heavy duty applications such as high pressure pumps of the type used in oil well servicing. Such pumps, which are usually of the reciprocating piston type, are often required to pump large volumes of fluid at pressures up to 10,000 pounds or more per square inch. Pumps made for oil well servicing use must be, of necessity, as compact and light as possible because the pumps and their motive power source must be mounted on a truck or trailer which is capable of being transported readily over rough terrain as well as over highways where dimensional and weight restrictions of vehicles are enforced.

It can also be appreciated that pumps designed for oil well servicing should be (and are) characterized by long-lived performance without repairs, especially when it is considered that the pumps often are used hundreds of miles from the nearest pump repair facilities. Further, aside from the inconvenience of pump failure as regards the repairing of the pump, irreparable damage to the well being serviced may occur. For example, when the pump fails, the well bore may be half filled with cement which will set up quickly and seal the well bore.

In view of the above discussion of the type of service for which reciprocating type oil field pumps are used, it can be appreciated that it is desirable to have connecting rods used in such pumps which are both compact and yet capable of being operated under very severe load conditions over extended periods of time.

One of the difficulties encountered with connecting rods formerly used in such pumps and in conventional roller bearing type connecting rods has been that the bearing ends of the rods were non-symmetrical and thus tended to warp during use in a non-symmetrical manner. The result has been that the bearings were also twisted slightly, and tests have shown that under such conditions the entire load of the bearing is borne by a small fraction of the bearing surface rather than being distributed uniformly across the bearing surface.

Another disadvantage of former types of connecting rod ends having roller bearings fitted therein is that the rod end which contains the bearing is bulky and heavy in order to provide support for the outer race of the bearing yet contributes little to the load-carrying capacity of the connecting rod. As a result, in order to provide clearance for the connecting rod during operation thereof, the pump or other housing must be larger than otherwise needed when such connecting rods are used. As stated before, in pumps mounted for mobile usage compactness of the pump is highly desirable because of dimentional limitations for highway vehicles.

Further, during the manufacture of connecting rods the precise machining of non-symmetrical rod ends, and especially rod ends which are integral with the shank of the rod, presents difficult problems as does the assembling of such rods (and their attached crossheads or pistons) into the pumps.

Accordingly, a principal object of this invention is to provide an improved roller bearing connecting rod which is small in size as compared to its load-carrying capacity.

Another object of this invention is to provide an improved multiple section roller bearing connecting rod which is economical to manufacture, easy to install, has large load-carrying capabilities for its size, and is relatively free from non-symmetrical warpage during usage thereof.

In accordance with the present invention there is provided a connecting rod having a shank and a crosshead or piston end bearing made as an integral member. The shank also has an arcuate crank bearing receiving surface at the end thereof which is opposite to the crosshead or piston end of the rod. A roller bearing having a symmetrical outer race fits against the bearing receiving surface. Clamps, extending from opposite sides of the shank, which engage grooves in the outer race of the roller bearing and are bolted to the shank, hold the roller bearing in position against the bearing receiving surface.

The invention, as well as additional objects and advantages thereof, will best be understood when the following detailed description is read in connection with the accompanying drawings, in which:

Fig. 3 is a side elevational view of the connecting rod of Fig. 2;

Fig. 4 is a fragmentary sectional view taken along the line 4—4 of Fig. 3, and

Fig. 5 is a sectional view taken along the line 5—5 of Fig. 3.

Figure 1:
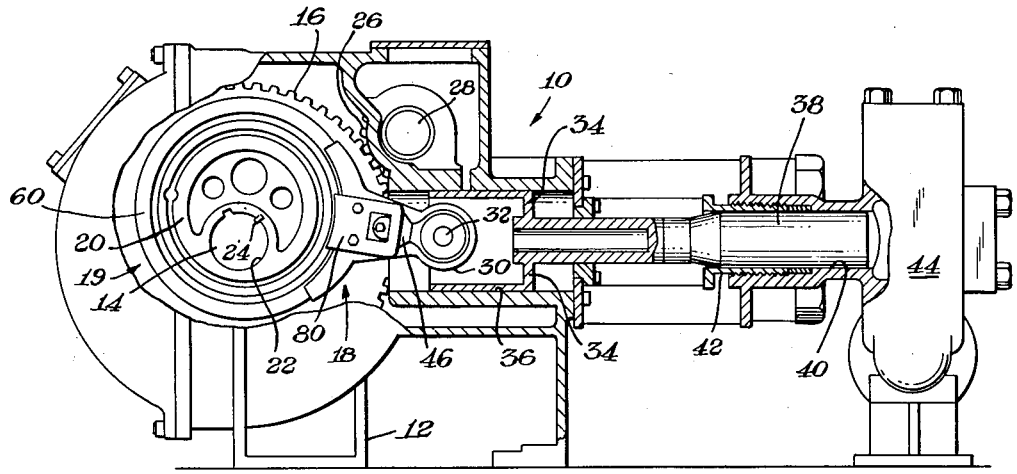
Fig. 1 is an assembly view, partly in section, of a reciprocating piston type pump using connecting rods made in accordance with this invention.

Referring to Fig. 1, there is shown a reciprocating piston type pump, indicated generally by the numeral 10. The pump 10 includes a frame 12 from which is supported a straight drive or crank-shaft 14 to which is attached at least one drive gear 16 and at least one connecting rod, indicated generally by the numeral 18, which has a crankshaft bearing indicated generally by the numeral 19. The bearing 19 has an inner race part 20 having an eccentrically disposed bore 22 through which the drive shaft 14 passes.

Figure 2:
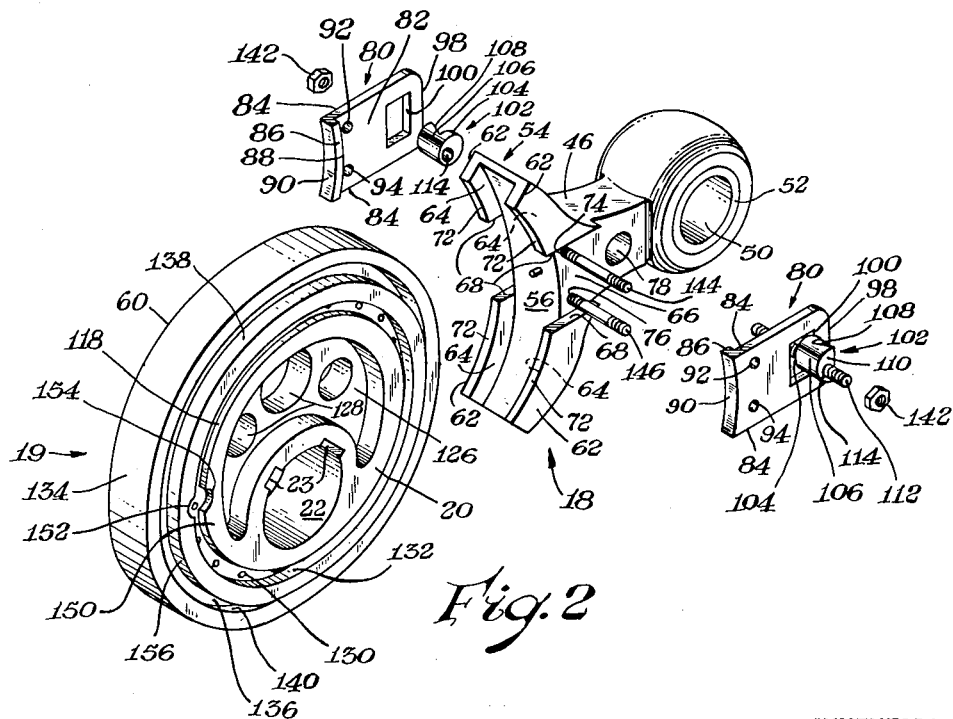
Fig. 2 is an exploded isometric view of a connecting rod made in accordance with this invention.

The inner race 20 is secured to the drive shaft 14 by keys 24 inserted in keyways 23 (see Figs. 2 and 3) between the shaft 14 and the wall of the bore 22 in the inner race 20. The drive gear 16 is driven by a pinion gear 26 on the pinion shaft 28 to which is applied operating power from an external source (not shown). The crosshead bearing end 30 of the connecting rod 18 is connected by a crosshead pin 32 to a crosshead 34 which rides in a cross-head bore liner 36. A piston 38, rigidly connected to the crosshead 34, rides in the working cylinder 40 of the pump. The piston 38 is sealed in the cylinder 40 by a packing gland 42. The valve mechanism of the pump 10 (not shown) is contained in the valve chamber which is indicated generally by the numeral 44.

Normally each pump 10 has three working cylinders 40 arranged side by side with the drive or crankshaft 14 having three eccentrically driven connecting rods 18 attached thereto. Customarily the drive or crankshaft 14 is driven by a drive gear 16 near each end of the shaft 14 with the connecting rods 18 secured to the shaft between the two drive gears 16.

As may be seen more clearly in Figs. 2 through 5, the connecting rod 18 comprises a shank 46 of steel and which has an end part 30 integral therewith which contains a bore 50 for a crosshead or piston journal 52. The opposite or crankshaft end, indicated generally by the numeral 54, of the shank 46 is of enlarged cross-sectional area in height and thickness as compared to the rest of the shank 46 and terminates in a concave arcuate surface 56 conforming to the outside of a segment of a cylinder whose axis of revolution is parallel to the axis of the bore 50. Each side of the concave arcuate surface 56 is bordered along its extremities by flanges 62 which extend from the crankshaft end 54 of the shank 46. The inner sides or walls 64, 64' of the flanges 62 are machined to form smooth, flat surfaces which extend perpendicularly from each side of the arcuate surface 56. The inner walls 64 of the flanges 62 on each side of the arcuate surface 56 are lineally aligned and are parallel to and similarly disposed with respect to the corresponding wall surface which lies opposite thereto. The flanges may either be integral with the shank or bolted or otherwise secured thereto in a non-movable manner. Alternatively, the end 54 of the shank 46 may be described as a grooved end member having the groove walls removed from the central part of each side of the groove.

The side surfaces 66 of the shank 46 between the flanges 62, as well as the end edge surfaces 68 of the flanges 62 which face each other, are machined flat. The flat surfaces 66 on each side of the shank 46 lie in substantially the same plane as the inner flange wall surfaces 64 on the respective sides of the shank 46. The pairs of flange edges 68 which face each other are parallel to each other, perpendicular to the flattened side surfaces of the shank, and symmetrically disposed on each side of the central axis 70 through the connecting rod 18. The outer peripheral edge surfaces 72 of the flanges are arcuate ribbon-like surfaces and are concentric with the arcuate surface 56 but have a slightly smaller radius of curvature than does the arcuate surface 56. Two bores 74, 76, of small diameter as compared to the height and thickness of the shank 46, extend perpendicularly through and between the central flattened side surfaces 66 of the shank 46 between the parallel edge surfaces 68 of the flanges 62. A bore 78, of larger diameter than the bores 74, 76, extends perpendicularly through the shank 46 between the flattened side surfaces 66 thereof, but is closer to the crosshead or piston end 48 of the shank 46 than are the smaller bores 74, 76. A pair of complementarily shaped clamps, indicated generally by the numeral 80, each of somewhat L-shaped longitudinal cross-sectional configuration, are provided. The clamps 80 each have a flat side surface 82 adapted to abut against the flat side surface 66 of the shank 46 and have flat, parallel edge surfaces 84 perpendicular to the flat side surface 82 thereof. The distance between the parallel edge surfaces 84 of the clamps 80 is such that each clamp 80 fits closely but slidably between the two adjoining parallel edge surfaces 68 of the flanges 62 previously mentioned. Each clamp 80 has a laterally extending flange or boss 86 at one end thereof. Each flange 86 has arcuate surfaces 88, 90, which, when the clamps 80 are installed in the assembly in their operative positions, are concentric with the arcuate surface 56 on the crank end 54 of said shank 46. Each arcuate surface 88, 90 of a clamp flange 80 has a smaller radius of curvature than does the arcuate surface 56 at the crank end 54 of the shank 46.

Each of the clamps 80 has a pair of bores 92, 94 extending therethrough which, when the clamps 80 are in their operative position, are aligned with the two small bores 74, 76 in the shank 46. Each of the clamps also has a rectangularly shaped cutout or aperture 96 near the end 98 of the clamp 80 which is remote from the flange 86. The cutout 96 is larger in length and width than the diameter of the larger bore 78 in the shank 46. When the clamps 80 are in operating position, the end 100 of the cutout which is most remote from the shoulder or flange 86 on the clamp 80 lies somewhere between the center of the larger bore 78 in the shank 46 and the side thereof which is most remote from the arcuate surface 56 at the crank end 54 of the shank 46. Each of the clamps 80 are drawn into operative position by means of a wedge member, indicated generally by the numeral 102, which has a cylindrical end section 104 of appropriate diameter to slidably, but not loosely, fit into the larger bore 78 in the shank 46. The body part of the wedge member 102 has a rounded surface 106 of the same radius of curvature as the cylindrical end section 104 which engages the wall of the larger bore 78 in the shank 46. The wedge member 102 has an inclined planar surface 108 on the side thereof opposite to the curved surface 106, the incline of the planar surface 108 being such that the transverse cross-sectional area of the wedge member 102 through the inclined surface 108 near the cylindrical end section 104 is smaller than the transverse cross-sectional area nearer the other or outer end 110 of the wedge member 102.

When the shank section of the connecting rod 18 is assembled, the two wedge members 102 are inserted in the larger bore 78 with the cylindrical end sections 104 facing each other. A bolt 112 is then passed through a bore 114 which extends longitudinally through each wedge member 102. The clamps 80 are then fitted onto the shank 46 with the ends 100 of the cutouts 96 in the clamps placed against the inclined planar surfaces 108 of the respective wedge members 102 with the clamp flanges 86 facing each other. Nuts 116 are then threaded loosely over the threaded ends of the bolt 112. The shank section is then ready for the crank bearing 19 to be attached thereto.

The eccentrically mounted crankshaft bearing 19 comprises an inner bearing race 20 having a circular periphery 118 and having an off-center crankshaft bore 22 having two keyways 23. The wall 126 of the inner race 20 is routed and provided with bores 128 which lighten and help to balance the inner race structure. The periphery 118 of the inner race is grooved to permit a plurality of cylindrically shaped bearing rollers 130 to ride therein. The rollers 130 are held in place by a similar groove in the inner peripheral side 132 of an outer bearing race 60. The outer bearing race 60 is a symmetrically shaped member having a smooth outer peripheral surface 134. The outer peripheral part 134 of the outer race 60 has the same radius of curvature and width as the arcuate surface 56 at the crank end 54 of the connecting rod shank 46. When the connecting rod 19 is assembled, the outer race 60 fits snugly against the arcuate surface 56 and between the flanges 62 which border the arcuate surface 56. The outer body part of the outer race 60 and the bearing retaining inner peripheral part 132 thereof is separated by a circularly extending groove 136 on each side of the race 60, each groove 136 extending completely around its side of the outer race 60. The grooves 136 each are concentric with respect to the peripheral surface 134 of the outer race, are straight walled with the walls 138, 140 of the groove 136 being perpendicular to the base or bottom of the groove and parallel to the peripheral surface of the outer race. The depth of the grooves 136, when measured from the side of the peripheral part 134 of the outer race 60, is at least as great as the distance the flanged end part 86 of the clamp 80 extends from the inner flat surface 82 of the clamp 80 and the width of the groove 136 is at least as great as the thickness of the flange 86 of the clamps 80. The distance between the peripheral surface 134 of the outer race 60 and the outer wall 140 of the groove 136 is such that, when the outer race 60 is fitted against the arcuate surface 56 and the clamps 80 are in position with the surfaces 88 of the flanges 80 riding against the outer wall 140 of the grooves 136, the small bores 92, 94 in each clamp 80 are aligned with the small bores 74, 76 in the shank 46. The radius of curvature of the clamp flange surface 88 which engages the outer wall 140 of the groove 136 in the side of the outer race 60 is the same as the radius of curvature of the outer wall 140 of the groove 136.

The side-to-side thickness of the bearing retaining inner peripheral part 134 of the outer race 60 is approximately equal to the side-to-side thickness of the outer peripheral part 134 of the bearing 19 plus the thickness of the body part of each of the two clamps 80. The thickness of the outer race 60, as measured between the inner peripheral part 132 and the outer peripheral part 134 thereof, is greater than the usual thickness of an outer race having the same inner diametrical dimensions since the outer race 60 must withstand severe loads without appreciable physical distortion thereof.

The arcuate surface 56 on the shank 46 distributes over a large area the load on the outer race 60 when the rod 19 is under compression, but the outer race structure alone bears the load at other times during the operation of the connecting rod. When the clamps 80 are in place, the wedge member 102 is tightened by means of the nuts 142 to hold the roller bearing 19 tightly against the arcuate surface 56 of the crank end 54 of the shank 46. Bolts 144, 146 are then passed through the small bores 92, 94 in the clamps 80 and the aligned bores 74, 76 in the shank 46 and are tightened by means of the nuts 148.

One outer side wall 150 of the inner race 20 contains a curved notch 152. A similar notch 154 is in the inner wall 156 of the outer race 60 which is on the same side of the bearing as the wall 150. These notches 152, 154, when aligned, permit the individual rollers 130 of the bearing 19 to be inserted between the two races 20, 60. Because the bearing strength is weakest when the notches 152, 154 are aligned, the arcuate surface 56 on the crank end 54 of the shank 46 contains a small pin 158 which, when the bearing 19 is inserted into the crank end 54 of the shank 46, fits within a small bore 160 in the outer peripheral surface 134 of the outer race 60. The small bore 160 is disposed opposite the notch 152 in the outer race 60, assuring that the notch 152 will always be remote from the part of the bearing 19 which is under the greatest load during the time the connecting rod 18 is under compression.

While the inner race 20 has been described as having the shaft bore 22 eccentrically disposed therein, connecting rods in which the shaft bore of the inner race is centrally disposed are within the scope of this invention.

Several advantages accrue to the use of the connecting rods of this invention in high pressure pumps adapted for oil field servicing applications. First, the lightness and compactness of the crank bearing 19 as compared to the load handling ability of the rod 18 makes such connecting rods well suited for use in mobile pumps 10.

Also, during manufacture of the pumps the shank 46 of the connecting rod 18 may be attached to the crosshead 34 and the crossheads 34 inserted in the crosshead bore liner 36 one at a time since the connecting rods 18 are not attached to a drive or crankshaft 14. Conversely, the crankshaft bearings 19 may be mounted on the crankshaft 14 with a minimum of effort because the shank 46 of the rods 19 and the crossheads 34 are not attached to the bearings 19. When the crankshaft 14 with bearings 19 installed thereon is installed in the pump 10, the shanks 46 of the connecting rods 19 may be easily clamped to crankshaft bearings 19. The correct position for connecting the shank 46 to the bearing 19 is assured by aligning the locator pin 158 with the bore 160 in the outer peripheral surface 134 of the outer race 60. Thus, the clamps 80 cannot engage the wall 140 of the groove 136 unless the outer race 60 of the bearing 19 is properly aligned with respect to the arcuate surface 56 of the shank 46.

The above features make practical the quick changing of crankshaft bearings in the field by disconnecting the connecting rod shanks 46 from the crankshaft bearings 19 and substituting another crankshaft with connecting rod bearings installed thereon for the crankshaft having a damaged bearing.

In addition, because of the symmetrical round construction of the crankshaft bearing 19, the chances of non-uniform warpage of the bearing structure during use are minimized. Thus, the bearing 19 may be subjected to loads more closely approximating its theoretical capacity than would be permissible with so-called conventional roller bearing connecting rods where non-uniform warping of the rod ends often results in a small fraction of the bearing surfaces carrying almost the entire load of the connecting rod. Likewise, the symmetry of the crankshaft bearing 19 makes the bearing races easier to manufacture than are non-symmetrically shaped crankshaft ends of bearings.

While connecting rods of this invention have been described in connection with pumps intended for mobile use, such connecting rods are adapted for use in other pumps and engines where the features of the invention may be used to advantage, and the removable bearings may be used as either or both bearings of the connecting rod.

When a connecting rod having two removable bearings is desired, both ends of the shank are formed generally as is the end 54 of the shank of the connecting rod 18.

We claim:

1. A multi-section connecting rod comprising a shank section and at least one detachable bearing, said shank section including a bearing receiving walled arcuate groove at at least one end thereof, at least a part of the walls of said groove being removably attached to said shank section, said removably attachable part of said wall including bearing retaining means for securing a detachable bearing to said shank section, said detachable bearing having an outer peripheral part of the same curvature as said arcuate groove in said shank section and adapted to fit closely in said arcuate groove, the sides of said detachable bearing being adapted to receive said bearing retaining means.

2. A multi-section connecting rod comprising a shank section and a detachable bearing, said shank section having a bearing receiving arcuate groove at one end thereof, said groove having walls including segments which are removably attached to said shank section, at least a part of said removably attachable wall segments including bearing retaining means, said bearing including an inner race and an outer race, the inner race containing a shaft bore, said outer race including an outer peripheral part having the same radius of curvature as said arcuate groove in said shank section and adapted to fit closely in said arcuate groove, the sides of said outer race being adapted to receive said bearing retaining means.

3. A multi-section connecting rod comprising a shank section and a detachable bearing section, said shank section including a body member having a journal bearing receiving bore at one end thereof and a bearing receiving walled arcuate groove at the other end thereof, at least a part of each wall of said arcuate groove being removably attached to said body member, said removably attachable wall parts including bearing retaining means, said bearing section including an inner race and an outer race separated by a plurality of bearings, the inner race containing a shaft bore, said outer face having an outer peripheral part of said outer race of the same radius of curvature as said arcuate groove in said shank section and adapted to fit closely in said arcuate groove, said outer race being adapted to receive said bearing retaining means.

4. A connecting rod in accordance with claim 3, wherein said bearing retaining means comprises inwardly extending flanges on said removably attached wall parts and said outer race contains depressions shaped to receive said flanges in close fitting relationship thereto.

5. A connecting rod in accordance with claim 4, wherein means are provided for adjusting the bearing retaining means.

6. A multi-section connecting rod comprising a roller bearing including an outer race having parallel side walls and concentric inner and outer peripheral surfaces which are perpendicular to said side walls, the outer peripheral surface being of uniform width throughout, each side wall containing an annular groove which has a wall surface which is concentric with said peripheral surface, said concentric wall surface being the part of said groove which lies closest to said outer peripheral surface, and a shank section, one end of said shank section being a bearing receiving end having a concave arcuate surface of the same radius of curvature as the outer peripheral surface of said outer race, said concave arcuate surface being bordered at its side edges along its extremities by pairs of oppositely disposed outwardly axially extending flanges having inner planar surfaces which are perpendicular to said concave arcuate surface, the width of said concave arcuate surface and the outwardly extending length of said flanges being such that said outer race fits slidably therebetween and seats gainst said concave arcuate surface in substantially continuous surface-to-surface contact therewith, a plurality of removable clamps, one of said clamps being adjustably secured to each of two opposite sides of said shank section between said flanges extending outwardly therefrom and extending outwardly beyond said concave arcuate surface, each of said clamps including a clamping flange adjacent to said outwardly extending edge of said clamp, said clamping flanges facing each other when said clamps are in operative position on said shank section, each clamp flange having an arcuate surface which is concentric with and has the same radius of curvature as said groove wall which is next adjacent to said outer peripheral surface of the outer race, each of said clamp flanges being adapted to fit into one of said grooves in the outer race with said arcuate surface thereof engaging said outer wall of said groove, and means for adjusting the position of said clamps to draw said arcuate surfaces of the clamp flanges against said groove wall to maintain said roller bearing tightly against said bearing receiving end of the shank section.

7. A multi-section connecting rod in accordance with claim 6, wherein said roller bearing includes an inner race having an eccentrically disposed shaft bore extending therethrough, the longitudinal axis of said shaft bore being parallel to the longitudinal axis of said outer race.

8. A multi-section connecting rod in accordance with claim 6, wherein said means for adjusting the position of said clamps comprises a plurality of wedge-like members which engaged a surface of said clamps.

9. A multi-section connecting rod in accordance with claim 6, wherein said shank section includes a journal bearing bore and said inner race includes a shaft bore, the longitudinal axes of said bores being parallel to each other and to the longitudinal axis of said arcuate surface of said bearing receiving end of the shank section.

10. A multi-section connecting rod comprising a shank section and a bearing section, said shank section including a shank having two parallel sides and a bearing receiving arcuate surface at one end thereof, the sides of said arcuate surface bordering said sides of said shank, and a pair of removably attachable clamps, including bearing retaining means, one of said clamps being secured to each side of said shank and extending beyond said arcuate surface intermediate the ends thereof, said bearing section including an outer race having an outer peripheral part and sides, the outer peripheral part of said outer race having the same radius of curvature as said arcuate surface in said shank and being adapted to fit closely against said arcuate surface, the sides of said outer race being adapted to receive said bearing retaining means.

No references cited.